July 31, 1928.
L. J. HULL
1,679,085
HYDRAULIC RESISTANCE CONTROL APPARATUS
Filed March 6, 1925
4 Sheets-Sheet 1
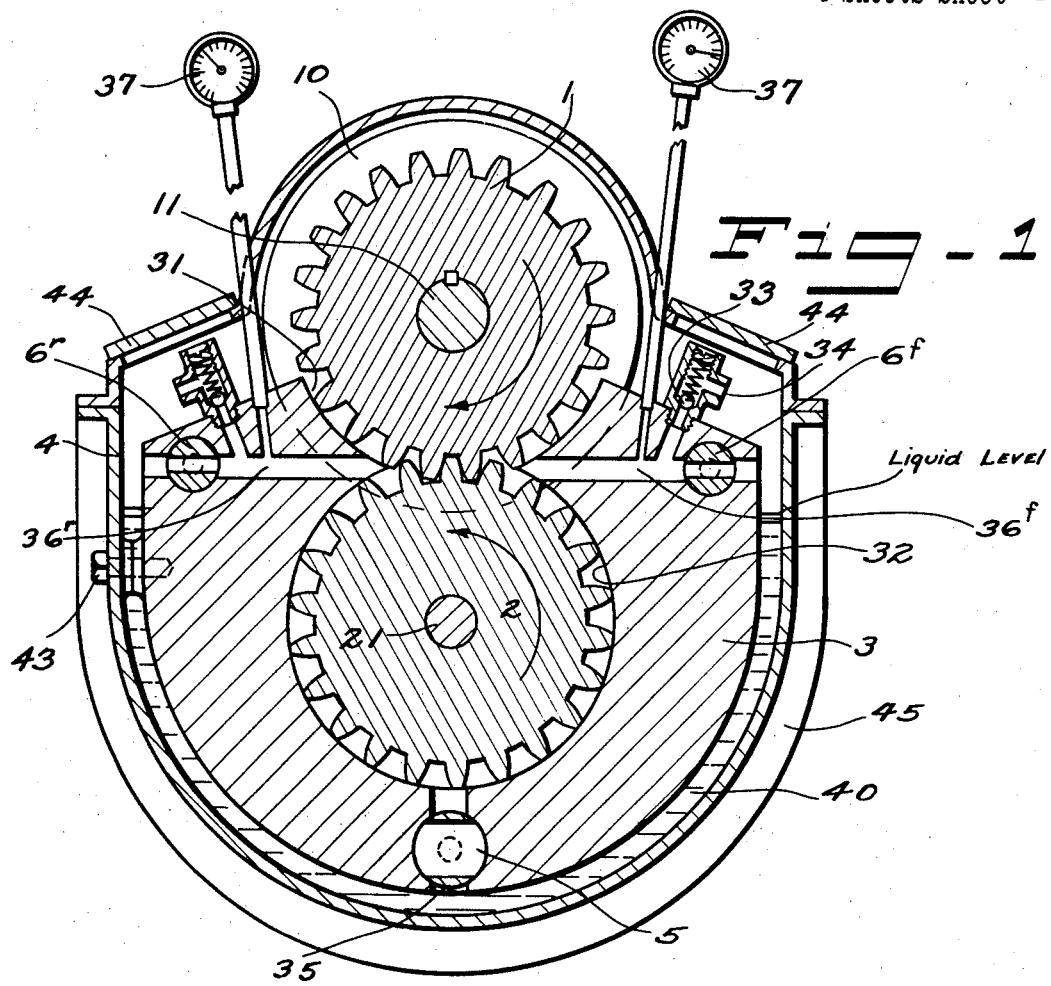
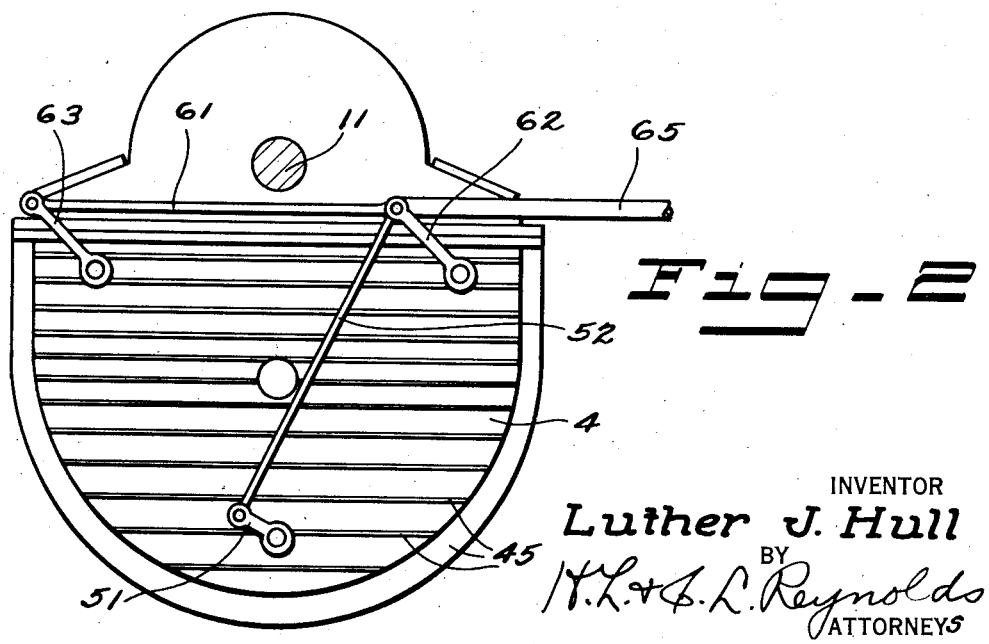
INVENTOR
Luther J. Hull
BY
*H.L. & S.L. Reynolds*
ATTORNEYS

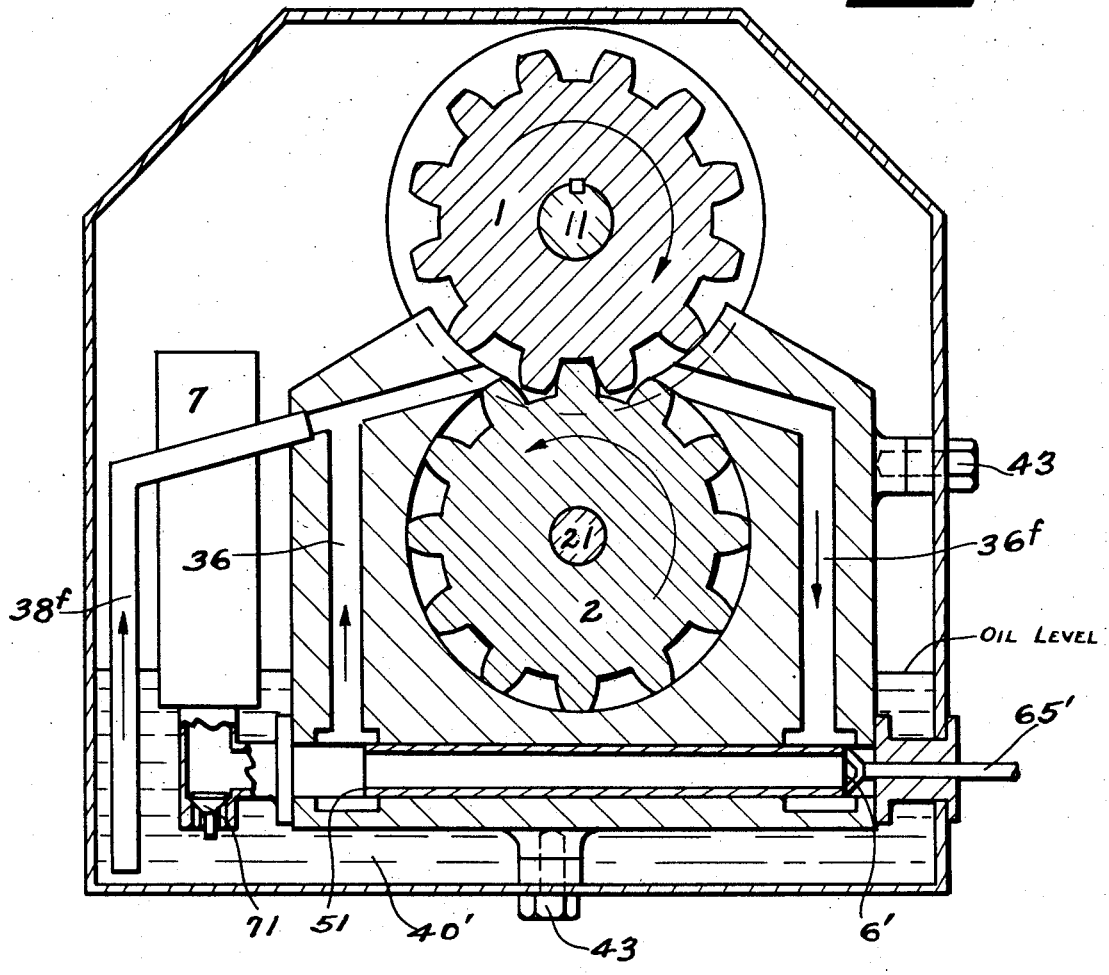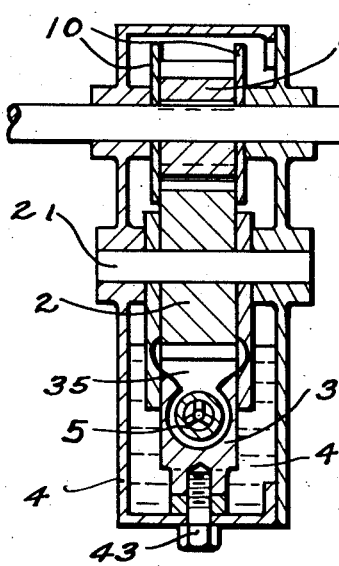

July 31, 1928.

L. J. HULL 1,679,085

HYDRAULIC RESISTANCE CONTROL APPARATUS

Filed March 6, 1925

INVENTOR
Luther J. Hull
BY
H.L. & C.L. Reynolds
ATTORNEYS

July 31, 1928. 1,679,085
L. J. HULL
HYDRAULIC RESISTANCE CONTROL APPARATUS
Filed March 6, 1925 4 Sheets-Sheet 4
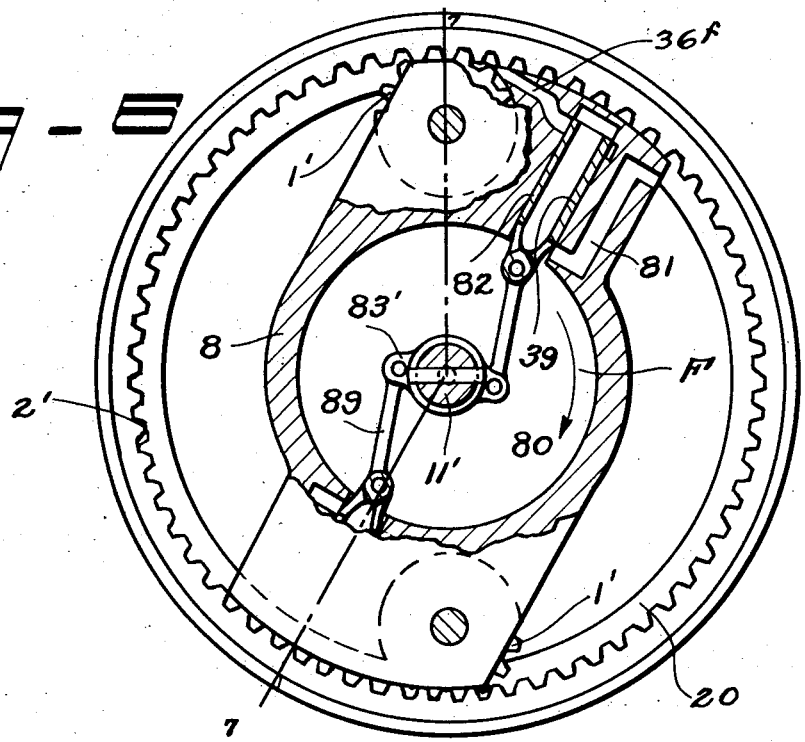
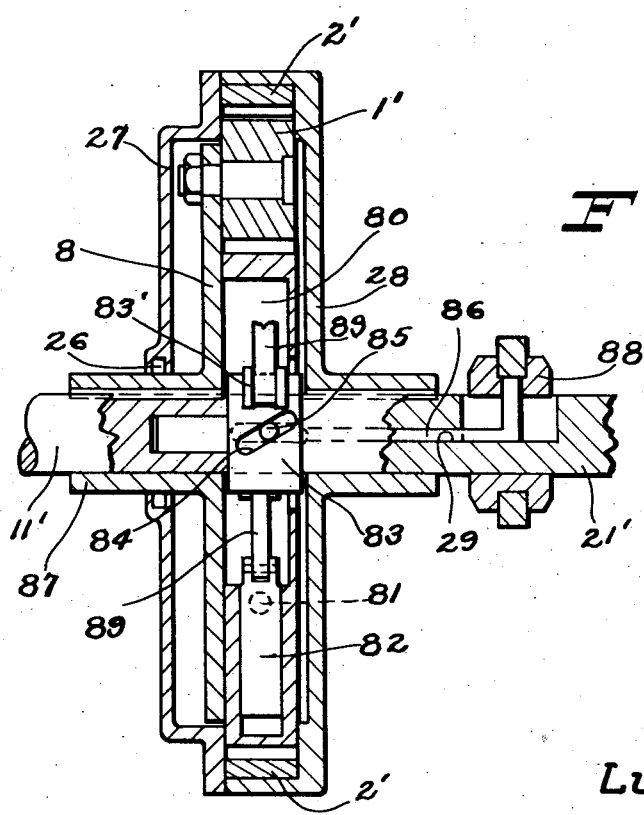
INVENTOR
Luther J. Hull
BY
H.L.&G.L. Reynolds
ATTORNEYS Patented July 31, 1928.

1,679,085

UNITED STATES PATENT OFFICE.

LUTHER J. HULL, OF SEATTLE, WASHINGTON.

HYDRAULIC RESISTANCE CONTROL APPARATUS.

Application filed March 6, 1925. Serial No. 13,479.

My invention relates to a means for controlling power transmission devices. Stated differently, it relates to means for interposing a resistance, variable between selected maxima and minima, and either movable or immovable, to the movement of a member in motion through the application of power thereto.

In one aspect it is concerned with the control of the application of power between a driving member and a driven member, as exemplified in a clutch. In another aspect, treating a moving vehicle with its momentum as a source of power and the wheels as resisting elements, it is concerned with the control of the application of the resistance to the source of power as exemplified in a brake.

More specifically stated, my invention relates to members cooperating as in a pump usually in the form of a gear pump with two gears continuously in mesh, one rotatable from a power source to drive the pump, with means for controlling the movement of fluid, preferably a liquid, through the pump so that the resistance to movement of the pump members, as related to the casing enclosing them, may be varied between maximum and minimum limits. Thus in the case of a clutch, by producing a maximum resistance to relative movement the clutch elements are engaged to rotate together, yet by opposing a minimum resistance the driven member may rotate freely relative to the driving member so that the clutch is released. This is an example of the application of a movable resistance. In a brake the resistance to relative movement of the pumping members may be made a minimum so that the one member, driven by the movement of the car, will move freely relative to the other member, this being the normal running relation with the brake released, or the resistance may be increased to a maximum, generally just short of locking the two parts together, so that a maximum braking effect may be applied by resisting movement of the member rotated by the momentum of the vehicle. This is an example of the application of a resistance which is immovable, or nearly so.

In devices employing pumps, and particularly gear pumps in such connections, so far as I am aware it has always been the practice to circulate the fluid continuously through the pump. This in itself produces resistance and the circulation of the fluid through the pump consumes some proportion of the power which, when the pump is running at high speed, amounts to a considerable factor. It is the chief object of the present invention, therefore, to provide means whereby the fluid may be controlled in its application to and passage through the pump, that when the minimum resistance is desired the fluid is exhausted from the pump and no further fluid is admitted thereto, thus permitting the pump to run free without operating upon any fluid, other than air.

A further object is the provision of means in such devices whereby when resistance, however slight, to movement of the pumping members is required, the fluid can be instantly applied to and passed through the pump so that its passage may be controlled and so that thereby the resistance desired can be secured.

The building up of pressure in such pumps and its application as a resistance to movement of the pumping members, generates heat and it is another object of my invention, therefore, to provide means whereby the heat thus generated may be dissipated.

The above general objects are of course supplemented by objects relating more specifically to details of the device and its operation in various embodiments, as will be apparent from a study of the following specification, including the claims, and the drawings forming a part hereof.

When employed as a vehicle brake it is desirable that such devices should not completely lock, but should apply resistances to forward movement of the vehicle just short of locking resistance. It is a further object, therefore, when installed as a vehicle brake, to provide means whereby pressures in excess of a predetermined maximum, less than locking pressure, may be relieved.

My invention comprises the novel inventive concept illustrated in the accompanying drawings in several embodiments, and as will be hereinafter more particularly disclosed and pointed out in the claims terminating this specification.

In the accompanying drawings I have shown various embodiments of my invention, both as a clutch and in several forms of brakes.

Figure 1 is a vertical section through an embodiment of my invention arranged for employment as a vehicle brake.

Figure 2 is a side elevation thereof.

Figure 3 is a view similar to Figure 1 of a modified brake construction intended for one-way operation.

Figure 5 is a section on line 5—5 of Figure 4.

Figure 6 is a part elevation, with cover removed, and part section through a device embodying my invention and designed as a clutch.

Figure 7 is a section, substantially on line 7—7 of Figure 6.

Figure 4:
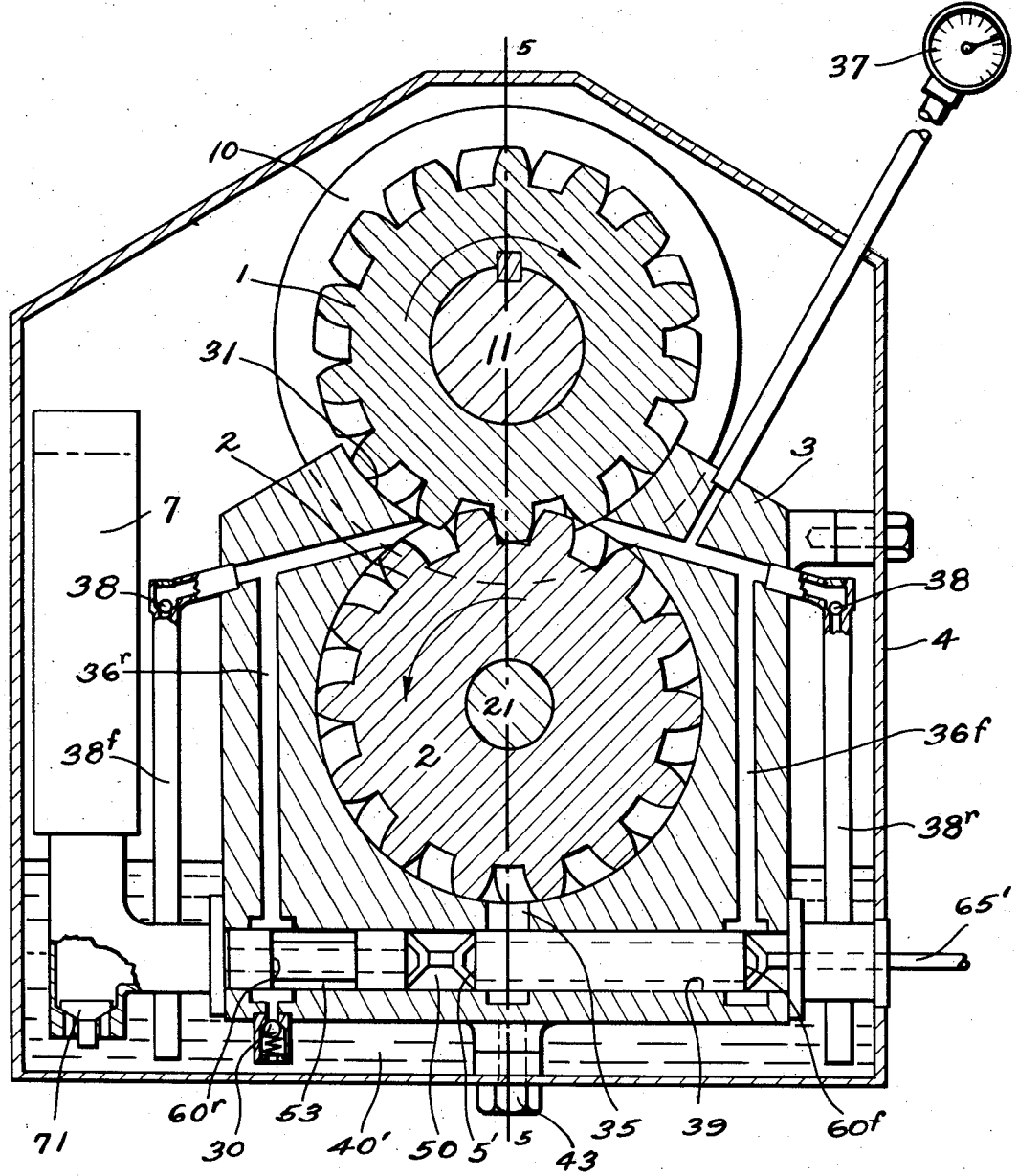
Figure 4 is a view similar to Figures 1 and 3, illustrating a brake of the type shown in Figure 3 and arranged for operation in opposite directions.

In Figures 1 and 2 I have shown a preferred embodiment of my device designed to be employed as a brake, and particularly as designed for use upon vehicles, as an automobile or street car, which may operate in both forward and reverse directions. The pump is shown in this form as a gear pump, the gear 1 meshing with the gear 2 and the meshing point of the two gears being suitably enclosed. For this purpose a casing 3 is formed with a central opening 32 within which the gear 2 is enclosed, this gear being journaled in the casing 3 upon a shaft 21. The casing 3 might also enclose the gear 1, but as shown herein the casing is cut away as indicated at 31 to form a running fit with several teeth of the gear 1 at each side of the meshing point of the two gears. To complete the encasing of the meshing point of the gears, a shrouding ring 10 is provided at each side of the gear 1, this having a running fit with the sides of the casing 3 and these shrouding rings extending outwardly beyond the ends of the teeth of the gear 1. The gear 1 is connected to a shaft 11 which rotates in accordance with the movement of the vehicle. This shaft, for example, may be the rear axle shaft of the vehicle. The distance between the shaft 21 and the shaft 11 is fixed, that is, the two shafts are not relatively separable.

The entire pump is encased within a housing 4, the casing being secured thereto as by bolts 43, and the casing is spaced from the inside of the housing 4 to form therebetween a fluid reservoir 40, which reservoir is filled, at least partially, with a fluid to be circulated through the pump. Preferably this fluid is an oil, its consistency and its other characteristics being determined by the service to which the device is to be put.

Inlet to the pump is had through an inlet port 35, affording communication between the chamber 32 and the reservoir 40, and being always below the level of liquid in the reservoir. The liquid level is indicated in the various figures, and in the form shown in Figure 1 it is desirable that this be carried at a point above the shaft 21, at least well above the port 35, but below outlet ports 36$^t$ and 36$^r$ which afford communication between the meshing portion of the teeth of the gears 1 and 2 and the interior of the housing 4. Where the brake is to operate in a single direction, a single outlet port only need be provided, but for operation in opposite directions the two ports are required.

Valve mechanism is employed for controlling the various ports. An inlet valve 5 and outlet valves 6$^t$ and 6$^r$ control the respective ports 35, 36$^t$ and 36$^r$. The inlet valve 5 is normally in closed position to block the port 35 and prevent inlet of fluid from the reservoir 40 into the pump chamber 32. The two outlet valves 6$^t$ and 6$^r$, however, are normally open. Thus with the inlet valve 5 closed and the valve 6$^t$ and 6$^r$ open and with the gear wheels 1 and 2 rotating in the direction of the arrows as shown in Figure 1, such as would be the case were the vehicle moving forward, the tendency of the pump gears is to exhaust any fluid in the pump, either through the port 36$^t$ or through the upper portion 31 of the block 3, if the fluid is received between the teeth of the gear 1. Any liquid which remains in the pump is thus discharged in one of the two ways described, or both, and drops into the reservoir 40. The valve 5 being closed, no additional liquid is received within the pump, but air may be admitted through the open valve 6$^r$ above the liquid level so that the pump will not be retarded by undue suction. In this condition the pump gears are running free with the minimum of resistance to their rotation relative to the casing 3, which casing, it will be understood, is suitably held fixed with relation to the vehicle body or chassis.

Preferably the valves 6$^t$ and 6$^r$ are connected to the same operating means for simultaneous actuation. Such means may consist of the lever arm 51 outside of the housing 4 and connected to the valve 5, and similar arms 62 and 63 connected to the valves 6$^t$ and 6$^r$, respectively, and connected by a link 61. The arm 51, which preferably is shorter than the arms 62 and 63 to give it larger movement for a corresponding movement of the actuating means, may be connected into the mechanism by a link 52. The entire mechanism may be operated by a single push and pull link 65.

When it is desired to apply the brakes, the valve 5 is moved towards open position. Thus, as the valve 5 begins to open, the valves 6$^r$ and 6$^t$ commence to restrict the outlet openings 36$^r$ and 36$^t$. The inlet valve 5 preferably moves more rapidly than the valves 6$^t$ and 6$^r$, as explained above, but in any event it is made sufficiently large that an ample supply of liquid will always be permitted to enter the pump, more than will be permitted to pass outward through the ports 36$^r$ or 36$^f$. Thus, upon opening the valve 5 the liquid in the reservoir 40, standing at a level thereabove, will tend to force in between the teeth of the gear 2, either directly or from the sides, and will be carried thereby as it rotates toward the meshing point of the two gears 1 and 2, where it will be subjected to pressure and will tend to be forced through the port 36$^f$.

Inasmuch as this port is restricted by the now closing valve 6$^f$, a pressure will be built up in this passage and a resistance will be created thereby to rotation of the gears 1 and 2. The amount of this resistance will be controlled by the amount of closing of the valve 6$^f$. The valve 6$^r$ is not a factor in this action except that in closing it restricts the supply of air permitted to enter the pump and lessens the retardation of oil entering the pump, which retardation, if present, is due to the presence of air therein.

Resistance to rotation of the gears may be built up from the minimum, where the pump is running free without the presence of oil within it, to a predetermined maximum with the valve 6 closed. When used in automobile braking service it is not desirable that the gears be locked and prevented altogether from rotating, and in order to prevent this I have shown a spring loaded relief valve 33 communicating with each of the ports 36$^f$ and 36$^r$, which will rise at a given pressure and permit the escape of fluid through the port 34 into the reservoir 40. The tension of the spring upon the valve 33 may be controlled in the usual manner upon removal of an inspection plate 44 immediately above the valve and covering an opening in the housing 4. Likewise a gage 37 may be connected in each of the passages 36$^f$ and 36$^r$ to indicate the pressure therein. For automobile service such a gage would ordinarily be required only for the forward direction, as the amount of braking while traveling in a reverse direction is negligible. For street car service two such gages would be practically essential, one being placed at each end of the car.

Heat is generated by the pressure developed in the pump, and by the resistance to movement of the vehicle. Any suitable means may be provided for dissipating this heat, and I have shown vanes 45 upon the outside of the housing 4 which will take up the heat from the oil and which will be cooled by the air as the vehicle moves forward.

It will be noted that movement of the control rod 65 to apply the brake while traveling forward would be to the right, as can be seen by comparison of Figures 1 and 2. Movement to apply the brake while traveling in the opposite direction would likewise be to the right, for such movement restricts each of the outlet valves 6$^r$ and 6$^f$, which is the condition necessary to cause braking. This action is identical with mechanical brakes, and thus requires no different actuation than that to which drivers are now accustomed.

In Figures 4 and 5 are shown a modified type of brake mechanism employing what is in effect a combination of the three valves of the previous form in a single valve chamber. Here the ports 36$^f$ and 36$^r$ and the inlet port 35 extend downward to a common valve chamber 39 in the casing 3. This chamber 39 is connected to a standpipe 7 which functions to a certain extent as the reservoir 40 in the previous form. The interior of the housing 4, however, also serves as a reservoir 40′ under certain conditions, as will be explained hereafter. The reservoir 40′ and the standpipe 7 are in communication, a check valve 71 controlling this communication.

A composite valve is placed in the valve chamber 39. This valve in general is in the form of a sleeve with a cut-out portion 50 communicating with its interior and between its ends. A by-pass portion 53 is positioned adjacent one end. One end 60$^f$ performs the same function as the valve 6$^f$ in the previous form, cooperating with the end of the passage 36$^f$, and an edge 60$^r$ performs the same function as the valve 6$^r$, cooperating with the end of the passage 36$^r$. It will be noted that these valves 60$^f$ and 60$^r$ are relatively positioned with respect to their ports to close at the same time, and of course, being rigidly connected, open by the same amounts. A third edge 5′ functions the same as the inlet valve 5 of the previous form. The port 36$^r$ communicates with the sump or reservoir 40′ through a check valve 30, and the passage 36$^f$ is in communication with the standpipe 7 through the tubular composite valve. It also is in communication with the port 35 through the right hand portion of this tubular valve, as seen in Figure 4, when the port 35 is uncovered. By-passes 38$^f$ and 38$^r$, each controlled by a check valve 38, afford communication between the passages 36$^r$ and 36$^f$, respectively, and the sump 40′.

Assuming the gears 1 and 2 to be rotating in the forward direction, as indicated by the arrows in Figure 4, any fluid in the pump will tend to pass out through the passage 36$^f$, thence past the open valve 60$^f$ and through the tubular valve into the standpipe 7, or it may pass between the teeth of the gear 1 and be thrown out of the recess 31 into the sump 40′. Any fluid remaining in the sump 40′ will be acted upon by suction through the by-pass 38$^f$ and will be lifted past the valve 38 in this line, thence will enter the pump and will eventually find its way into the standpipe 7.

Preferably liquid is retained in the standpipe at about or slightly above the level of the meshing point of the two gears. If there is any tendency for the oil in the standpipe to flow backward into the pump, this will be merely sufficient to permit lubrication thereof. However, when it is desired to apply the brake, that is, to create pressure and thus resistance to the gears 1 and 2, the composite valve is moved to the right, as by means of the rod 65′, and valve 5′ uncovers the port 35. The cut-out 50, being in communication with the interior of the valve and thus with the standpipe 7, and being below the level of oil in the standpipe 7, permits the oil to enter the pump. Movement of the valve likewise moves the valve 60$^t$ in the direction to restrict its opening, which places the liquid under control. The course of the liquid then is from the standpipe into the pump, through the cut-out 50 and port 35, thence into the passage 36$^t$, thence past the control valve 60$^t$, through the tubular valve and back to the cut-out 50, where it circulates again through the pump. This circulation, it will be noted, is only while the pump is actively engaged in braking. Any liquid passing out between the teeth of the gear 1 is received in the sump 40′ and is returned to the pump through the by-pass 38$^t$.

When it is desired to reverse and to apply the brake while reversing, the passage 36$^r$ becomes the pressure side and the passage 36$^t$ the suction side of the pump. Fluid entering through the port 35 or through the by-pass 38$^r$, is now passed through the pump and into the passage 36$^r$, whence it is forced past the valve 60$^r$, through the by-pass 53 and out into the sump 40′ past the check valve 30. Suction is applied to the sump through the by-pass 38$^r$ so that the oil is raised past the check valve 38 in this passage 38$^r$ and is circulated through the pump and out again through the port 36$^r$. In this manner circulation of the oil occurs during the reversal of the vehicle, whether or not the valve 5′ is open, but as such a brake would generally be employed only where reversal seldom occurs, as, for example, in an automobile, the loss of efficiency during such reversal would be slight. If after reversing for some time so as to empty the standpipe 7, the vehicle starts forward, but the brakes are applied again before the standpipe 7 is refilled, it will be noted that oil from the sump 40′ may be drawn past the check valve 71, which is immersed therein, and thus into the interior of the tubular control valve and into the pump. This necessitates that the sump 40′ be of such capacity as to carry the level of oil, when the standpipe 7 is emptied, well above the check valve 71.

A simpler form of brake is shown in Figure 3. This is intended for operation in a single direction only and employs a single control valve. In this form the suction passage 36 is continuously open to the standpipe 7 when the brake is in operation. Liquid is supplied through this passage, or through the suction pipe 38$^t$ leading to the sump 40′, to the pump gears through which it circulates to pass into the passage 36$^t$, where it is under control by the valve 6′, which is closed so far as may be necessary to secure the desired braking effect. The oil is returned past the valve 6′, through the interior thereof to the passage 36, where it again circulates through the pump. When the brake is not required, however, the valve 5′ is moved to the left to close the end of the passage 36, thus preventing further intake to the valve except through the by-pass 38$^t$. Any liquid in the pump or entering it from the sump 40′ will be exhausted past the open valve 6′ and will be stored in the standpipe 7 for use when required.

The same principle may be embodied in a clutch, as shown in Figures 6 and 7. In this form the driving member may comprise a block 8, corresponding to the casing 3, within which is a reservoir 80 for the reception of liquid, this corresponding to the stand pipe 7 or the reservoir 40. A pinion 1′, journaled in the block 8, meshes with an internal ring gear 2′ forming a part of the driven member of the clutch. The block 8 fits closely about the teeth of the gear 2′ in advance of the pinion 1′, thus placing under control of the two gears in mesh and functioning as a pump any liquid entering between the teeth of the gear 2′ in advance of the pinion 1′. A pressure port 36$^t$ connects with a valve chamber 39 and a discharge port 81 affords an outlet from the reservoir 80 to the teeth of the gear 2′. The gear 2′ in this instance is provided with shrouding rings 20. A sleeve valve 82 in the valve chamber 39 controls the ports 36$^t$ and 81 and is suitably controllable. Preferably this mechanism is duplicated at opposite sides of the clutch for better balance, as many units as may be necessary being employed.

Assuming the driving member 8 to be rotating in the direction of the arrow F and with the valve 82 positioned to cover the discharge port 81, any oil lying in the teeth of the gear 2′ will be subjected to pressure at the meshing points between this gear and the pinions 1′ and will be forced through the port 36$^t$ to the inner reservoir 80. In this condition the clutch is running free and there is substantially no resistance to movement of the drive member 8 relative to the driven member 2′. When it is desired to apply the clutch, however, the valve 82 is moved outward to close the port 36$^t$, fluid being released by centrifugal force from the reservoir 80 through the now open port 81 to the teeth of the gear 2′. The application of power may be gradual but when the valve 82 fully closes the port 36ᵗ the gears become substantially locked and remain so until the port 34ᵗ is opened so that the gear 1′ may again rotate.

As a means for controlling the application of the clutch, any suitable device may be employed. I have shown merely a rotative collar 83 having an inclined slot 84 within which is movable a pin 85, this pin being reciprocable axially of the driven shaft 21′ by means of a rod 86 disposed in a slot 29 of the shaft and controlled by a collar and yoke 88 outside of the clutch. Ears 83′ on the collar 83 connect the collar by means of links 89 with the several valves 82. A cap 27, secured to the disk 28 which is keyed to the driven shaft 21′ and which carries the gear 2′, has a packing ring 26 fitting the hub 87 of the member 8, thus to prevent leakage of oil from the clutch. The member 8 is keyed to the driving shaft 11′.

What I claim as my invention is:

1. The combination with a fluid pump having an inlet and an outlet, and including gears continuously rotatable to build up pressure upon fluid passing through the pump, of valve means for controlling the fluid discharged from said pump to resist rotation of said gears, other valve means operable to admit fluid while said first valve means controls the discharge of fluid and to prevent admission of fluid while said first valve means is in open position, additional valve means for controlling the fluid discharged from said pump when operating in a reverse direction, thereby to resist rotation of said gears, and means connecting the three control valves for simultaneous actuation, said actuating means being movable in the same direction for control of the valves to effect braking in either forward or reverse directions.

2. In combination with a gear pump including a normally stationary and a normally movable member, and having an inlet and an outlet, means for controlling the inlet to and outlet from said pump to drain fluid therefrom and to prevent the supply of additional fluid thereto except when said outlet is restricted to resist actuation of said movable member.

3. A brake comprising a pair of intermeshed gears rotative during normal operation of mechanism, means controlling the admission of liquid to said gears, and means controlling the discharge of liquid therefrom to cause a variable resistance to rotation of said gears in the forward direction, like means for controlling discharge when rotating in the opposite direction, and means for simultaneously actuating the three control means to admit liquid only as the discharge in either direction is restricted.

4. The combination with a liquid reservoir and a reversible gear pump therein and driven from a power source, the pump being partially immersed in the liquid in said reservoir, said pump having an inlet below the lowest level of liquid therein, and opposite outlets above the highest level of liquid in the reservoir, of a normally open outlet valve in each of said outlets, a normally closed valve in said inlet, and means connecting all of said valves for simultaneous actuation, whereby said inlet valve opens upon movement of the outlet valves towards a position to restrict the outlets.

5. A power-transmission controlling device comprising a housing and a casing therein and spaced therefrom to form a fluid reservoir, a gear journaled in and enclosed within said casing, a second gear in mesh with said first gear, the meshing portions of said gears being encased, and one of said gears being connected to a source of power, an outlet port affording communication between the meshing portions of said gears and said reservoir, an inlet port affording communication between the enclosed gear and said reservoir, a normally closed valve in said inlet port and a normally open valve in said outlet port, and means connecting said valves for simultaneous actuation, whereby the inlet valve commences to open upon movement of the outlet valve towards closed position.

6. A hydraulic brake comprising a housing and a casing fixed therein and spaced therefrom to form a liquid reservoir, a gear journaled in and enclosed within said casing, a second gear in mesh with said first gear, shrouding plates extending outward beyond the ends of the teeth in said second gear, and cooperating with said casing to enclose the meshing portions of said teeth, one of said gears being connected to a normally rotating shaft, an outlet port affording communication between the meshing portion of said gears and said reservoir, an inlet port affording communication between the enclosed gear and said reservoir, a normally closed valve in said inlet port and a normally open valve in said outlet port, and means connecting said valves for simultaneous actuation, whereby the inlet valve opens upon movement of the outlet valve towards closed position, and closes as said outlet valve reaches open position.

7. The combination with a liquid reservoir and a gear pump therein, the pump having its inlet immersed within the liquid in said reservoir and its outlet above the liquid level, of valve means controlling said inlet and outlet, to permit the supply of liquid to the pump and to control its passage therethrough to vary thereby the resistance to movement of the pump gears between a maximum and a minimum, said valve means being operable, when in position corresponding to minimum resistance, to permit exhaustion of the liquid from the pump into the reservoir to prevent admission of further liquid thereto.

8. The combination of claim 7, the valve means including a normally closed valve in the pump inlet and a second normally open valve in its outlet, and means connecting said valves for simultaneous actuation, whereby the inlet valve commences to open upon movement of the outlet valve towards closed position.

9. A device as in claim 7, including means for relieving resistances above a predetermined maximum.

10. A device as in claim 7, the valve means comprising a normally closed valve in the pump inlet and a normally open valve in its outlet, means connecting said valves for simultaneous actuation, whereby the inlet valve commences to open upon movement of the outlet valve towards closed position, and a relief valve upon the pressure side of said outlet valve to relieve pressures above a predetermined maximum.

Signed at Seattle, King County, Washington, this 26th day of February, 1925.

LUTHER J. HULL.